(12) United States Patent
Childe et al.

(10) Patent No.: US 7,834,501 B2
(45) Date of Patent: Nov. 16, 2010

(54) BEARING ASSEMBLY

(75) Inventors: Matthew John Childe, Wiltshire (GB); Peter Lee Crossley, Cambridge (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 682 days.

(21) Appl. No.: 10/572,266

(22) PCT Filed: Sep. 17, 2004

(86) PCT No.: PCT/GB2004/003995

§ 371 (c)(1),
(2), (4) Date: May 3, 2007

(87) PCT Pub. No.: WO2005/028886

PCT Pub. Date: Mar. 31, 2005

(65) Prior Publication Data

US 2007/0230839 A1    Oct. 4, 2007

(30) Foreign Application Priority Data

Sep. 19, 2003    (GB) ................................. 0321950.8

(51) Int. Cl.
H02K 7/08    (2006.01)
(52) U.S. Cl. ........................... 310/90; 310/51
(58) Field of Classification Search ............. 310/90, 310/51; 384/495, 536, 611
See application file for complete search history.

(56) References Cited

U.S. PATENT DOCUMENTS

| 2,986,432 | A |   | 5/1961  | Schlauch |
|-----------|---|---|---------|----------|
| 3,264,503 | A |   | 8/1966  | Wiedemann |
| 3,679,277 | A | * | 7/1972  | Dohmen ..................... 384/480 |
| 3,853,429 | A | * | 12/1974 | Wiedenmann ............... 417/356 |
| 3,897,985 | A |   | 8/1975  | Davis et al. |
| 4,136,914 | A |   | 1/1979  | Ostling |
| 4,823,032 | A | * | 4/1989  | Ward et al. .................... 310/43 |
| 4,969,797 | A |   | 11/1990 | Maruyama et al. |
| 5,022,039 | A | * | 6/1991  | Karube et al. ................. 372/58 |
| 5,235,227 | A | * | 8/1993  | Fazekas ....................... 310/51 |
| 5,592,716 | A |   | 1/1997  | Moren et al. |
| 5,844,748 | A | * | 12/1998 | Dunfield et al. .......... 360/99.08 |
| 6,129,455 | A |   | 10/2000 | Galante |

(Continued)

FOREIGN PATENT DOCUMENTS

DE    2415416    10/1975

(Continued)

OTHER PUBLICATIONS

International Search Report directed to PCT/GB2004/003995.

(Continued)

*Primary Examiner*—Dang D Le
(74) *Attorney, Agent, or Firm*—Morrison & Foerster LLP

(57) ABSTRACT

A bearing assembly particularly suitable for the rotor arrangement of an electrical motor or generator includes a bearing located in a housing. The bearing has an inner race, an outer race, and a plurality of ball bearings between the inner and outer races. A portion of the housing is made up of a deformable flexible wall which permits the housing to conform to the shape of the outer race member, rather than forcing the outer race to conform to the shape of the housing, as was experienced hitherto.

23 Claims, 5 Drawing Sheets

U.S. PATENT DOCUMENTS 6,376,952 B1 * 4/2002 Stenta .................. 310/90
6,809,898 B1 * 10/2004 Prochazka ............... 360/99.08

FOREIGN PATENT DOCUMENTS

| DE | 19642193 A1 | 4/1998 |
|---|---|---|
| GB | 822380 | 10/1959 |
| GB | 2062365 | 5/1981 |
| GB | 2283133 | 4/1995 |
| GB | 2346420 A | 8/2000 |
| GB | 2388166 A | 11/2003 |
| JP | 61170250 | 7/1986 |
| JP | 10-146013 | 5/1998 |

OTHER PUBLICATIONS

GB Search Report directed to GB 0321950.8.

* cited by examiner

BEARING ASSEMBLY

FIELD OF THE INVENTION

This invention relates to a bearing assembly for, for example, the rotor of an electrical machine such as an electrical motor or generator.

BACKGROUND OF THE INVENTION

Electrical motors are widely used for many different applications and are commonly used in domestic appliances. For example, in a vacuum cleaner a motor is used to drive a fan that causes dirty air to be sucked through a dirty air inlet. The dirty air passes through some form of separation device such as a cyclonic or bag separator that separates dirt and dust from the airflow, and finally the air is exhausted from an air outlet.

Switched reluctance machines have become increasingly popular in recent years. In a switched reluctance motor, a stator has sets of poles that are sequentially energised to rotate a rotor into line with the energised pair of poles, under the influence of the magnetic fields associated with each set of poles. By rapidly switching between different pairs of poles, it is possible to cause the rotor to rotate at a very high speed.

A bearing assembly is employed to rotatably support the shaft of the rotor with respect to the stator. A typical bearing assembly comprises a bearing, which comprises a plurality of ball bearings held between an inner race and an outer race, and a housing for supporting the bearing against the shaft of the rotor.

A problem which may be encountered with conventional bearing assemblies is that the pressure of the housing against the outer race of the bearing may cause the bearing to deform.

SUMMARY OF THE INVENTION

The invention provides a bearing assembly comprising a bearing having an inner race and an outer race, the assembly further comprising a housing for the bearing, wherein a portion of the housing comprises a deformable wall.

The invention further provides a housing for a bearing having inner and outer races, wherein a portion of the housing comprises a deformable wall.

The provision of a deformable wall permits the housing to conform to the shape of the outer race member, rather than forcing the outer race to conform to the shape of the housing, as was experienced hitherto.

The deformable wall has a thickness of approximately 0.5 mm, but could have a thickness of between 0.1 mm to 2 mm.

Preferably, the deformable wall is an integral part of the housing. Thus, the housing and wall may be manufactured from a single process, such as die-casting, cold-forging or moulding.

Advantageously, the housing also contains means for supplying lubrication to the bearings, to ensure smooth running of the rotor assembly throughout the lifetime of the bearings.

Advantageously, the housing is made of a thermally conductive material. In conventional bearing assemblies, the bearings can get hot in use and, at very high rotational speeds, may even overheat. The provision of a thermally conductive housing for the bearing permits heat generated by the bearing to be dissipated. Thus, the bearing can be run at higher speeds than hitherto.

The invention is suitable for supporting rotor assemblies comprising a rotor on a shaft. Preferably, the bearing assemblies are located at both ends of the shaft. Resilient means may be provided on the housings to permit the rotor assembly to rotate about its own centre of mass, with little excursion. In conventional rotor assemblies having hard mounted bearing assemblies, the rotor tends to rotate about its geometric centre, which may cause radial stress on the bearings, thereby reducing their lifetime.

The resilient means may take the form of at least one o-ring attached to each housing. Preferably, a pair of o-rings is provided on each housing to equally support the bearing, with one ring attached to each end of each housing.

The invention is applicable to switched reluctance machines, and is particularly useful in such machines that operate at high speeds of, say, 100,000 revolutions per minute.

While the following embodiments describe the invention as applied to motors which are used to drive a fan in a vacuum cleaner, it will be appreciated that the invention can be applied to both motors and generators, for any type of application, and is not limited to vacuum cleaners or the field of domestic appliances.

BRIEF DESCRIPTION OF THE DRAWINGS

The invention will now be described, by way of example, with reference to the accompanying drawings, in which:—

Like reference numerals refer to like parts throughout the specification.

DETAILED DESCRIPTION OF THE INVENTION

Figure 1:
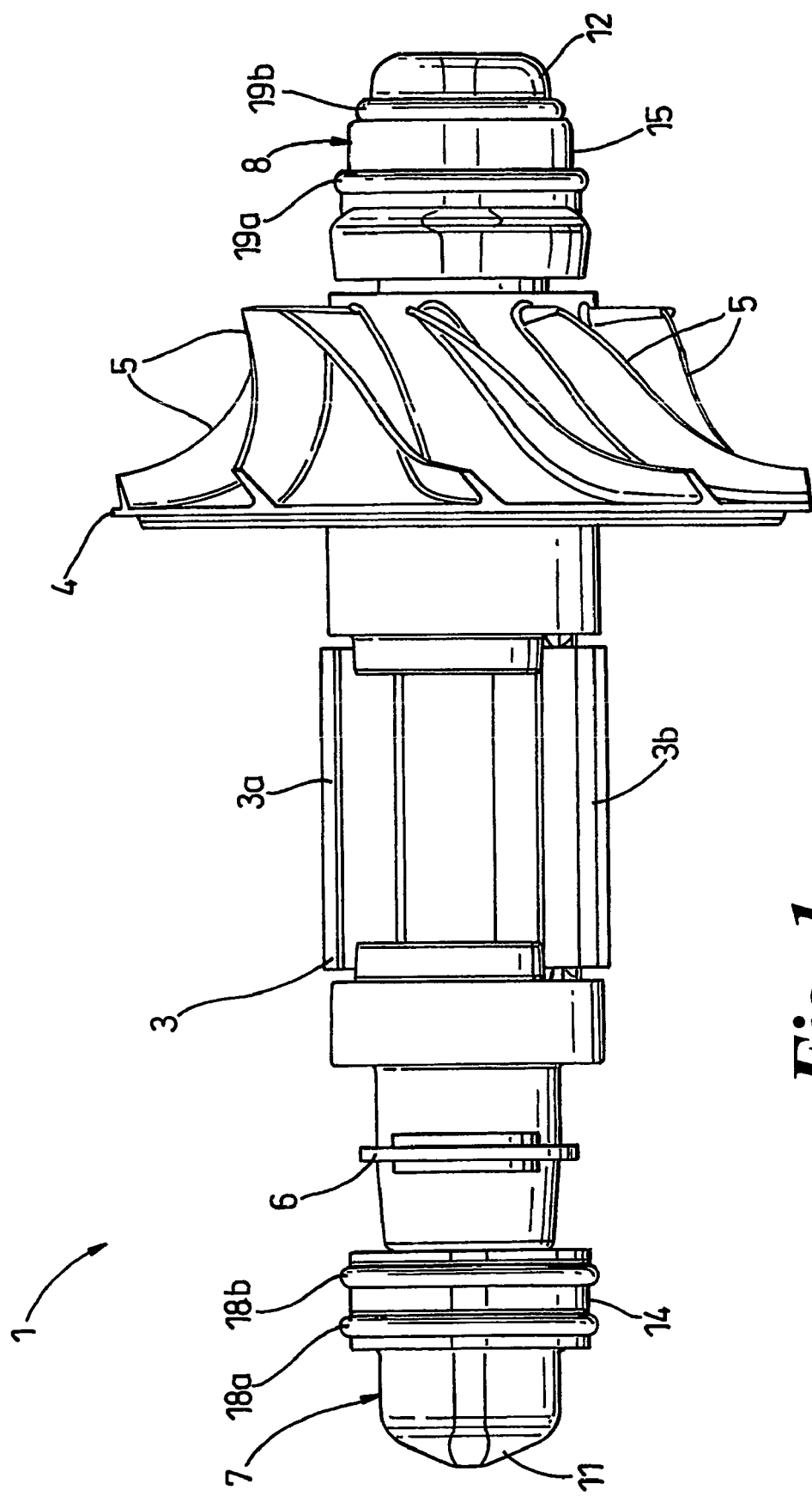
FIG. 1 shows a rotor assembly incorporating a bearing assembly having housings constructed in accordance with the invention.
Figure 2:
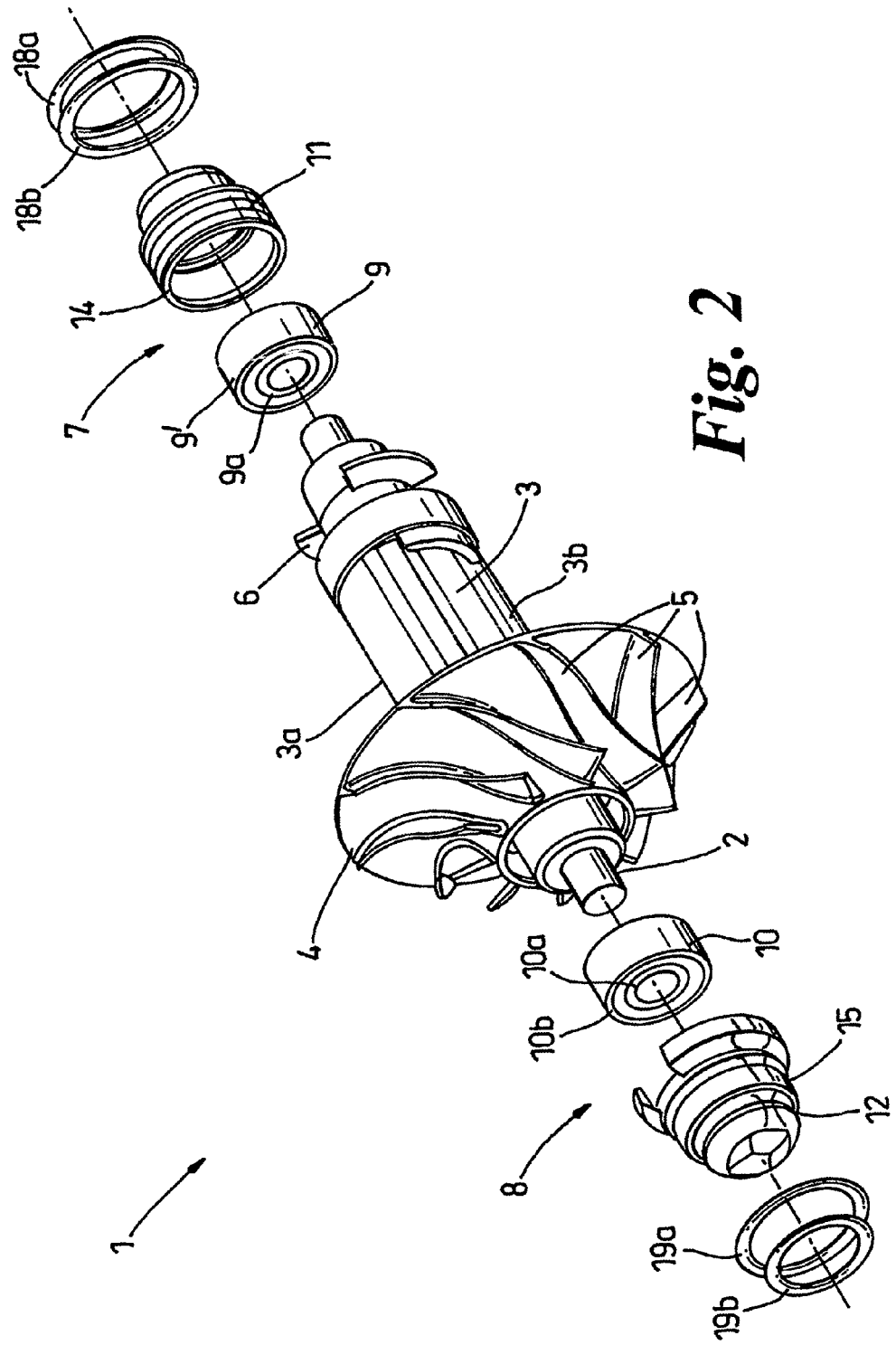
FIG. 2 is an exploded view of the rotor assembly of FIG. 1.
Figure 3:
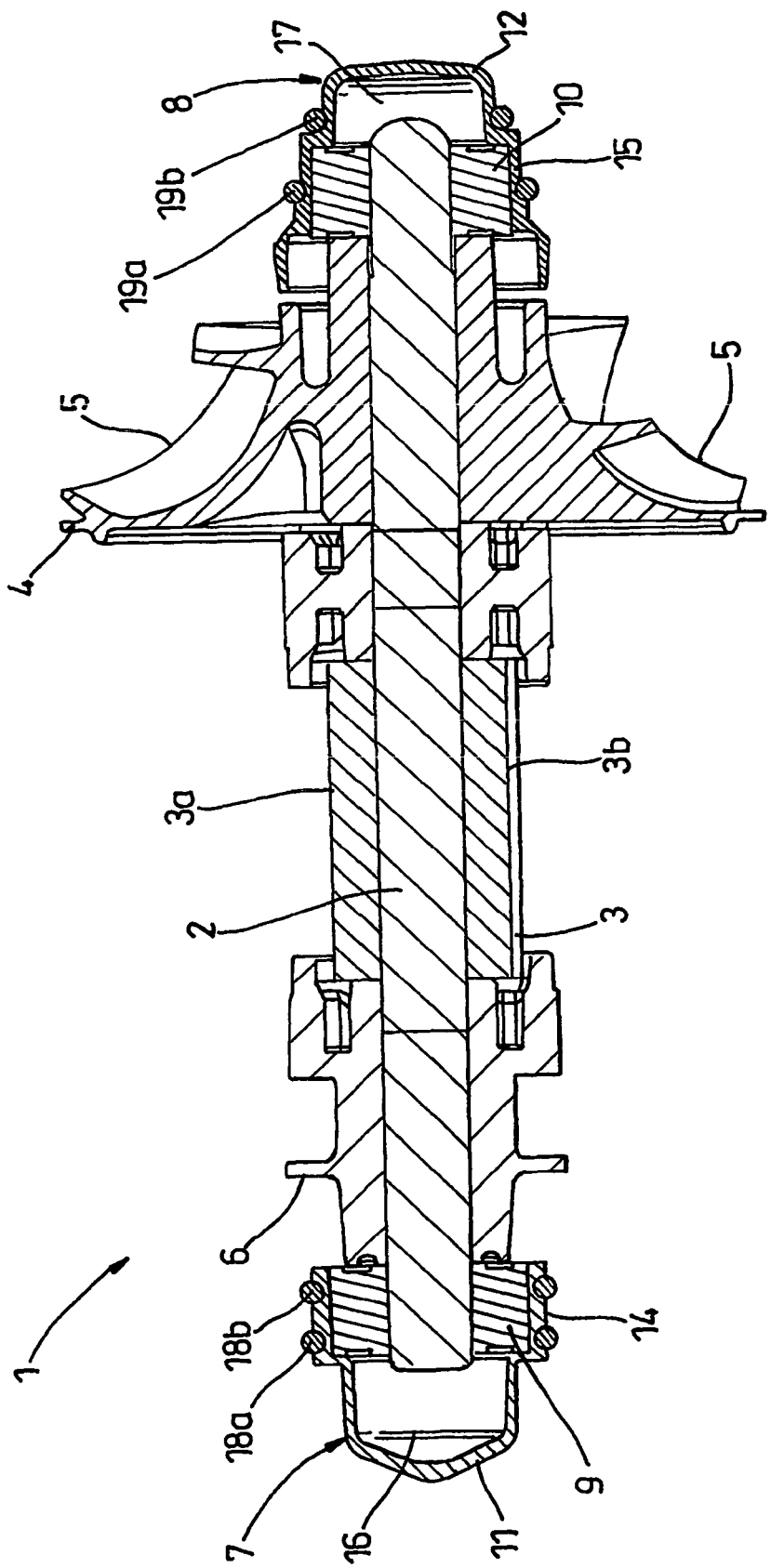
FIG. 3 is a sectional view of the rotor assembly of FIGS. 1 and 2.

FIGS. 1 to 3 show a rotor assembly indicated generally by the reference numeral 1. The rotor assembly 1 comprises a rotor shaft 2 having a rotor member 3. The rotor member 3 comprises an axially laminated stack of steel plates, arranged to form a pair of poles 3a, 3b. The shaft 2 also carries a coaxial impeller 4 having a plurality of blades 5 arranged to direct fluid flow from the shaft to the periphery of the impeller in tangential directions. The shaft also carries a pair of balance rings and a position indicator in the form of an optical encoder disc 6, to enable the rotational position of the rotor member 3 to be determined in use.

Figure 4:
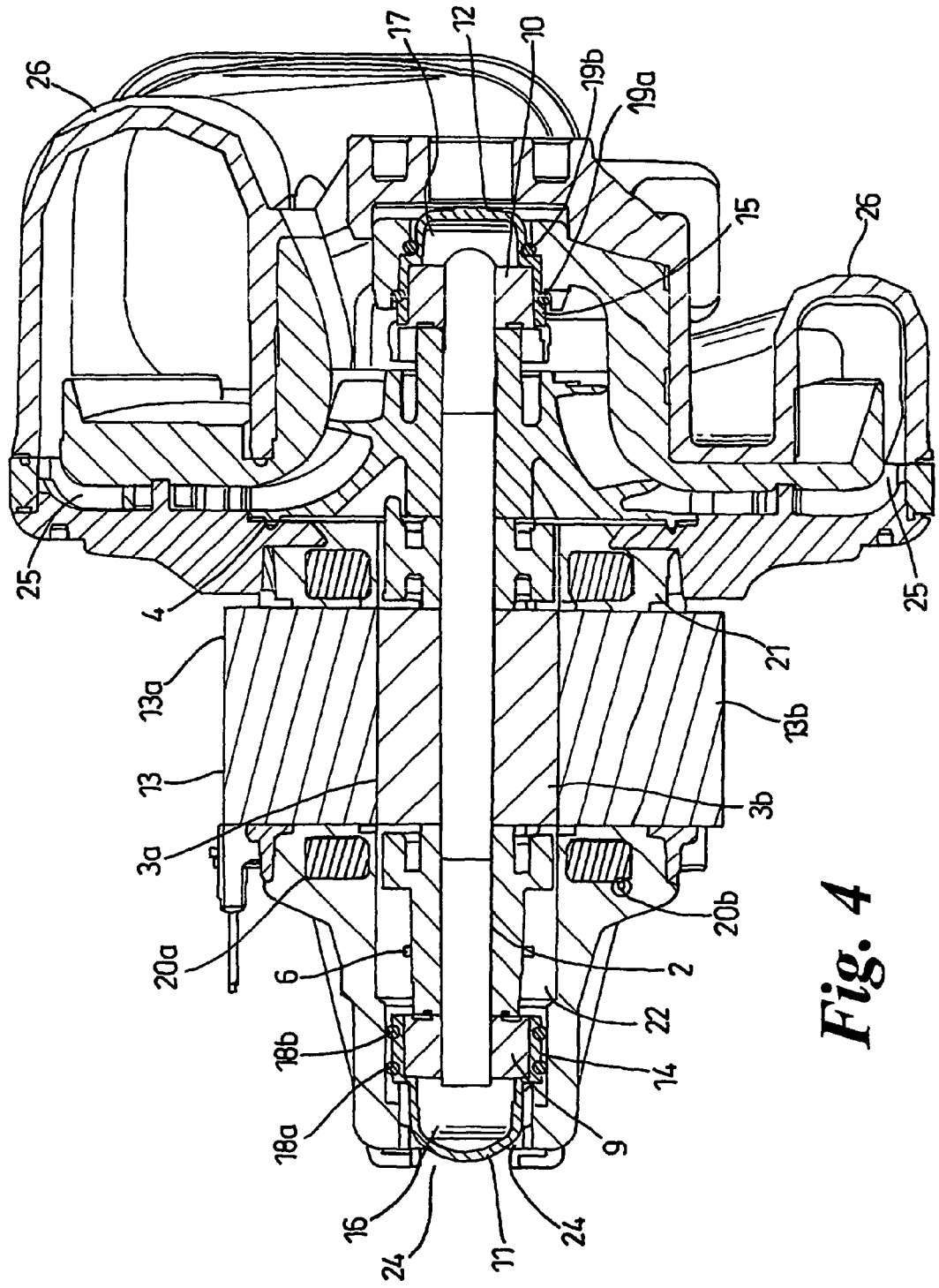
FIG. 4 is a sectional view of a motor incorporating the rotor assembly of FIGS. 1 to 3.

Bearing assemblies 7, 8 are provided on the shaft 2. Each bearing assembly 7, 8 comprises a bearing 9, 10 supported on the shaft 2 by a housing 11, 12. The bearings 9, 10 are arranged to press-fit into their respective housings 11, 12 and also to press-fit onto the rotor shaft 2. Each bearing 9, 10 comprises an inner race 9a, 9b, an outer race 10, 10b and a plurality of ball bearings (not shown) held between the races. The bearings 9, 10 permit the rotor 3 to be rotatably supported in a stator 13, such as is shown in FIG. 4.

In accordance with the invention, each bearing housing 11, 12 includes a flexible deformable wall 14, 15. Each wall 14, 15 comprises a thin metallic portion of the housing 11, 12 and is arranged to be radially deformable. Thus, in use, the wall 14, 15 of the housing 11, 12 tends to conform to the contours of the outer race 9b, 10b of the respective bearing 9, 10, with which it is held in close contact.

In previous arrangements with press-fit housings having rigid walls, the housing tended to push against the outer race of the bearing and deform it. It has been proposed to alleviate this problem by manufacturing the housings with greater accuracy, but this has involved more costly manufacturing techniques. Typically, housings are formed by means of cold forging or die casting techniques, neither of which are able to provide the manufacturing tolerances required for accurate push-fit housings. The invention permits the housing to be manufactured using these known techniques. Cold forging is an industrial process in which metal workpieces are squeezed between suitably contoured dies, typically at room temperature, to form a final desired shape. Die-casting is accomplished by forcing molten metal under high pressure into metal dies.

The housings also contain respective reservoirs 16, 17 of fluid, such as grease, which are arranged to provide lubrication to the bearings 9, 10 in use. Typically, the ball bearings are coated with grease that, over time, gets pushed out of the races. The reservoirs 16, 17 of grease supply the ball bearings with lubrication throughout their lifetime.

The bearing housings 11, 12 are supported against the stator 13 by resilient means 18, 19. In this embodiment, the resilient means 18, 19 is provided in the form of o-rings 18a, 18b, 19a and 19b. Each of the housings 11, 12 carries a pair of o-rings 18a, 18b and 19a, 19b. The o-rings of each pair are located at positions on the housings that correspond with the end portions of the bearings inside the respective housing. This soft mounting of the rotor shaft against a stator assembly permits the rotor assembly 1 to find its own centre of rotation in use. Thus, the rotor assembly 1 rotates about its own centre of mass, with little excursion. The provision of soft-mounted bearing assemblies also provides a reduction in transmitted loads and vibration.

The bearing assemblies 7, 8 are located at the extreme end portions of the rotor shaft 2. This feature aids the balancing of the shaft 2 during assembly.

The stator 13 comprises a stack of steel laminations arranged to have four inwardly projecting salient poles. Two of the poles 13a and 13b, diametrically opposite each other, are shown in FIG. 4. Each pole supports a winding 20a, 20b, which together form a first phase. The other diametrically opposite poles (not shown) similarly accommodate respective windings, which represent a second phase. Each winding comprises a large number of turns (e.g. 50+ turns) of an insulated electrical conductor around the respective stator pole.

The stator 13 and windings 20 are encapsulated by plastics material 21 by means of an injection-moulding process, by which plastic granules are melted, then injected into a mould cavity under pressure to create the required shape. During this process, the aperture 22 for the rotor assembly and an end cap 23 for receiving one of the bearing housings 11 are formed simultaneously.

An optical encoder disc 6, or chopper, is disposed on the rotor shaft 2. The disc 6 is associated with an optical sensor arranged to detect the rotation position of the disc and, hence the rotor member 3. Signals from the optical sensor are transmitted to a controller (not shown). The encoder disc 6 has a diameter smaller than that of the rotor member 3, which facilitates manufacture of the rotor assembly. During manufacture, the components of the rotor assembly are assembled on the shaft, and the entire rotor assembly is simply slotted into the aperture 22 provided for the rotor member 3, with the housing 11 abutting the end cap 23. Previously, the individual components of the rotor assembly were balanced separately before being incorporated into the motor or generator, produced a less than ideal balance condition of the completed rotor assembly. However, the rotor assembly of the present invention may be completed before final assembly of the motor, so that the complete rotor assembly may be balanced in one operation.

The controller is electrically connected to the drive circuit, to which the windings on each of the stator pole portions are connected. Torque is produced by switching current on in each phase winding in a sequence, so that a magnetic force of attraction results between the rotor and stator poles that are approaching each other. The current is switched off in each phase before the rotor poles nearest the stator poles of that phase rotate past the aligned position.

The impeller 4 rotates with the rotor shaft 2 and thus draws air into the motor. The bearing assembly 8 forms a nose cone located at the end of the shaft, upstream of the impeller 4. Hence, air being drawn in by the impeller 4 will firstly flow over the bearing assembly 8.

Heat generated by the bearing 10 is dissipated by the bearing housing 12, which is made of thermally conductive material. The airflow over the bearing assembly 8 serves to cool the bearing housing 12.

There is also provided an inlet 24 for a second airflow for the bearing assembly 7 at the other end of the shaft. Heat generated by the bearing 9 is dissipated by the thermally-conductive housing 11, which is cooled by the flow of air from the inlet 24.

Figure 5:
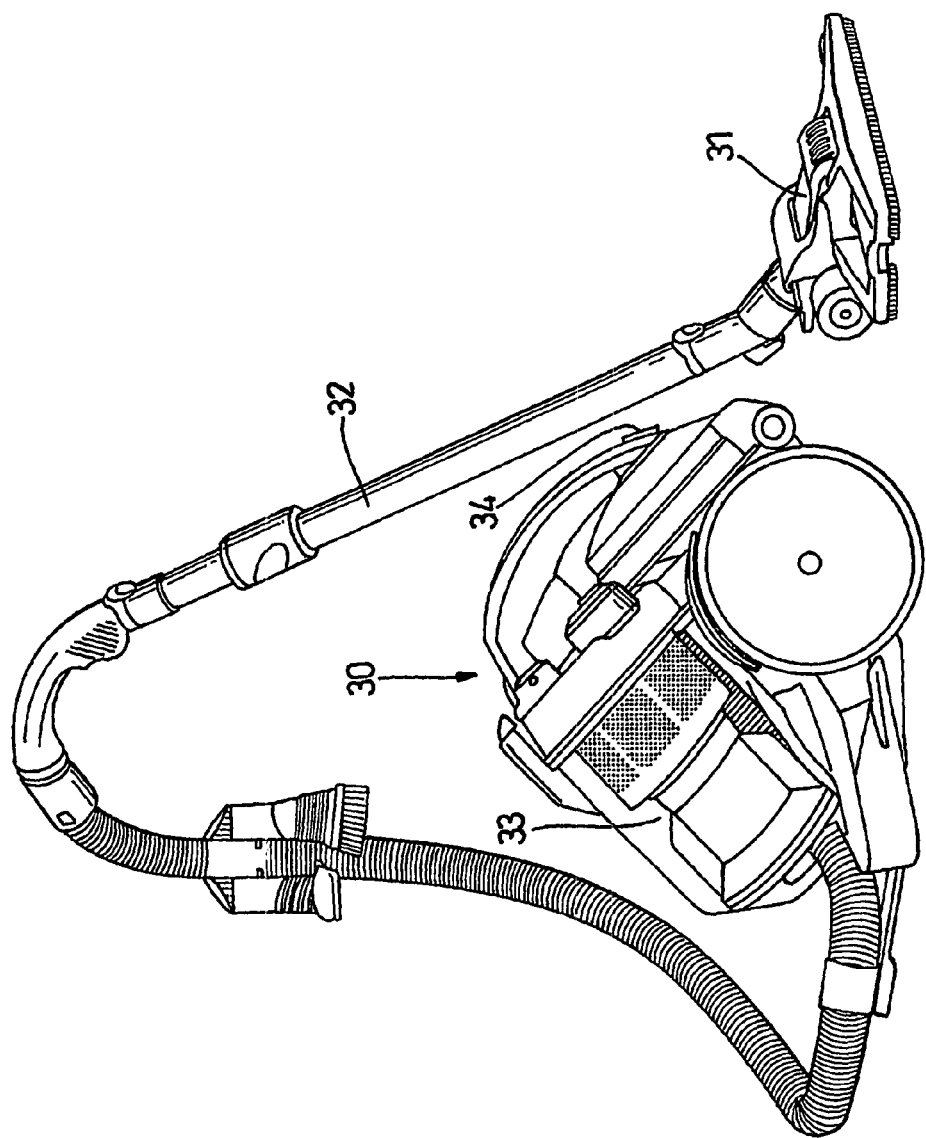
FIG. 5 is a side view of a vacuum cleaner incorporating the motor of FIG. 4.

FIG. 5 shows one example of a vacuum cleaner 30 in which the motor may be used. The motor-driven impeller 4 draws dirty air into the cleaner 30 via a nozzle 31 and a hose and wand assembly 32. The dirty air enters a separator 33, which serves to separate dirt and dust from the dirty air. The separator 33 can be a cyclonic separator, as shown here, or some other separator, such as a dust bag. Cleaned air leaves the separator 33 before entering the motor housing located within the main body 34 of the cleaner. A pre-motor filter is typically placed in the airflow path before the impeller to filter any fine dust particles that were not separated by separator 33.

In use, the motor rotates the impeller 4 at a very high speed (of around 100,000 rpm). The pumping action of the impeller 4 draws air through the cleaner. The air then flows over the bearing housings and is redirected by the impeller blades 5 through diffusion outlets 25 into the scroll 26.

A post-motor filter may be placed in the airflow path after the scroll. However, the provision of a brushless motor reduces the requirement for such a filter. The cleaned air is then exhausted from the cleaner to the atmosphere via a suitable outlet.

Variations to the described embodiments will be apparent to a skilled person and are intended to fall within the scope of the invention. For example, the deformable wall need not be an integral part of the housing. The wall could be manufactured from a different material to that of the rest of the housing.

The deformable wall may comprise a portion, or a plurality of portions, of the wall surrounding the bearing.

The provision of a deformable flexible wall provides reduced noise and vibration to rotor arrangements owing to reduced compressive forces on the bearings. The housings also assist in the dissipation of heat generated by the bearings in use.

The invention has been described with reference to bearings in which a plurality of ball bearings provides rotational motion. However, the invention is also applicable to other types of bearings, such as those employing rollers.

The bearing assembly of the invention is equally applicable to the rotor arrangements of motors and generators, not necessarily of the switched reluctance type, and may be employed in appliances other than domestic vacuum cleaners, such as lawn mowers, air conditioners, hand dryers and water pumps.

The invention claimed is:

1. A bearing assembly comprising:
a bearing having an inner race and an outer race;
a housing for the bearing, wherein a portion of the housing comprises a deformable metallic wall, the deformable metallic wall being configured to deform such that it substantially conforms to a contour of the outer race; and
a resilient structure provided on the housing for soft mounting the bearing assembly to a stator.

2. A bearing assembly as claimed in claim 1, wherein the deformable wall has a thickness of approximately 0.5 mm.

3. A bearing assembly as claimed in claim 1, wherein the deformable wall has a thickness of 0.1 mm to 2 mm.

4. A bearing assembly as claimed in claim 1, 2 or 3, wherein the deformable wall is integral with the rest of the housing.

5. A bearing assembly as claimed in claim 1, 2 or 3, wherein the deformable wall is in direct contact with the outer race of the bearing.

6. A bearing assembly as claimed in claim 1, 2 or 3, wherein the housing further comprises an arrangement for supplying lubrication to the bearing.

7. A bearing assembly as claimed in claim 6, wherein the arrangement for supplying lubrication comprises a reservoir of fluid.

8. A bearing assembly as claimed in claim 1, 2 or 3, wherein the housing is thermally conductive.

9. A bearing assembly as claimed in claim 1, 2 or 3, wherein the deformable wall is manufactured from zinc alloy material.

10. A rotor assembly for a motor comprising a rotor on a shaft having a bearing assembly at each end portion of the rotor assembly as claimed in claim 1, 2 or 3, the bearings being arranged to rotatably support the rotor and shaft.

11. A rotor assembly as claimed in claim 10, further comprising an impeller mounted in fixed relationship on the shaft.

12. A rotor assembly as claimed in claim 11, wherein the impeller is located between the bearing assemblies such that, in use, fluid pumped by the impeller is drawn over at least one of the bearing assemblies.

13. A rotor assembly as claimed in claim 10, wherein the resilient structure comprises an o-ring substantially concentric with the shaft.

14. A rotor assembly as claimed in claim 13, wherein the resilient structure comprises a pair of o-rings substantially concentric with the shaft and arranged at respective end portions of the housing.

15. An electrical machine comprising a rotor assembly as claimed in claim 13.

16. An electrical machine as claimed in claim 15, further comprising a stator in which the rotor assembly is located, the resilient structures being interposed between the bearing housings and the stator.

17. An electrical machine as claimed in claim 16, further comprising a detector detecting the rotational position of the rotor with respect to the stator.

18. An electrical machine as claimed in claim 17, further comprising electrical windings on the stator and a controller arranged to energize the windings in dependence on signals from the position detector.

19. An electrical machine as claimed in claim 18 in the form of a high-speed motor.

20. A cleaning appliance incorporating an electrical machine as claimed in claim 18.

21. A cleaning appliance incorporating a rotor assembly as claimed in claim 13.

22. A cleaning appliance incorporating a bearing assembly as claimed in claim 1, 2 or 3.

23. The bearing assembly of claim 1, wherein the resilient structure comprises an o-ring.

* * * * *